(12) United States Patent
Yoshikawa

(10) Patent No.: US 11,252,650 B2
(45) Date of Patent: Feb. 15, 2022

(54) NETWORK FUNCTIONS VIRTUALIZATION MANAGEMENT AND ORCHESTRATION APPARATUS, COMMUNICATION SYSTEM, METHOD, AND PROGRAM

(71) Applicant: NEC CORPORATION, Tokyo (JP)

(72) Inventor: Naoya Yoshikawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 27 days.

(21) Appl. No.: 16/496,643

(22) PCT Filed: Mar. 23, 2018

(86) PCT No.: PCT/JP2018/011610
§ 371 (c)(1),
(2) Date: Sep. 23, 2019

(87) PCT Pub. No.: WO2018/174225
PCT Pub. Date: Sep. 27, 2018

(65) Prior Publication Data
US 2020/0383041 A1   Dec. 3, 2020

(30) Foreign Application Priority Data

Mar. 24, 2017 (JP) .............................. JP2017-059347

(51) Int. Cl.
*H04W 48/18* (2009.01)
*G06F 9/455* (2018.01)
(Continued)

(52) U.S. Cl.
CPC ........ *H04W 48/18* (2013.01); *G06F 9/45558* (2013.01); *H04W 8/08* (2013.01); *H04W 36/0011* (2013.01); *G06F 2009/45595* (2013.01)

(58) Field of Classification Search
CPC ... H04W 48/18; H04W 8/08; H04W 36/0011; G06F 9/45558; G06F 2009/45595
See application file for complete search history.

(56) References Cited

U.S. PATENT DOCUMENTS 9,288,148 B1 * 3/2016 Krishnaswamy ... H04L 41/0893
2016/0095032 A1 * 3/2016 Varney ................. H04W 24/02
370/329
(Continued)

FOREIGN PATENT DOCUMENTS

| CN | 105975330 A | 9/2016 |
|---|---|---|
| WO | 2016/148001 A1 | 9/2016 |
| WO | 2017/002735 A1 | 1/2017 |

OTHER PUBLICATIONS

Communication dated Sep. 1, 2020 from Japanese Patent Office in JP Application No. 2019-507009.
(Continued)

*Primary Examiner* — Habte Mered
(74) *Attorney, Agent, or Firm* — Sughrue Mion, PLLC

(57) ABSTRACT

A network functions virtualization management and orchestration apparatus includes a plurality of VIMs, a visiting information manager, and a VNF arrangement controller. Each of the plurality of VIMs controls start and stop of a VNF in a virtual machine on each of servers connected to a plurality of respective base stations. The visiting information manager manages visiting information of each terminal wirelessly connecting to any of the base stations. The VNF arrangement controller controls arrangement of the VNF to provide services to the terminals, based on VIM management information and terminal visiting information, the VIM management information defining, for each VNF, a VIM capable of starting the VNF on each of the servers connected to the base stations.

18 Claims, 10 Drawing Sheets

(51) Int. Cl.
*H04W 8/08* (2009.01)
*H04W 36/00* (2009.01)

(56) References Cited

U.S. PATENT DOCUMENTS

| | | | |
|---|---|---|---|
| 2017/0048165 A1* | 2/2017 | Yu | H04L 47/82 |
| 2017/0063714 A1* | 3/2017 | Xiang | H04L 41/5058 |
| 2017/0086049 A1* | 3/2017 | Vrzic | H04W 40/00 |
| 2018/0004563 A1 | 1/2018 | Miyazaki | |
| 2018/0070262 A1 | 3/2018 | Nakano et al. | |
| 2018/0192330 A1* | 7/2018 | Yamasaki | H04W 88/18 |
| 2018/0262912 A1* | 9/2018 | Goldhamer | H04W 16/02 |
| 2019/0037398 A1* | 1/2019 | Eriksson | H04W 12/37 |
| 2019/0129745 A1 | 5/2019 | Wang | |
| 2019/0200316 A1* | 6/2019 | Wei | H04W 64/00 |

OTHER PUBLICATIONS

ETSI GS NFV-MAN 001 V1.1.1, "Network Functions Virtualisation (NFV); Management and Orchestration", Dec. 2014, pp. 1-184, (searched on Mar. 6, 2017) <http://www.etsi.org/deliver/etsi_gs/NFV-MAN/001_099/001/01.01.01_60/gs_NFV-MAN001v010101p.pdf>.

ETSI GS NFV 002 V1.2.1, "Network Functions Virtualisation (NFV); Architectural Framework", Dec. 2014, pp. 1-21, (searched on Mar. 6, 2017) <http://www.etsi.org/deliver/etsi_gs/NFV/001_099/002/01.02.01_60/gs_NFV002v010201p.pdf>.

International Search Report of PCT/JP2018/011610 dated Jun. 5, 2018 [PCT/ISA/210].

Extended European Search Report dated Jan. 23, 2020, issued by the European Patent Office in Application No. 18771305.2.

* cited by examiner

| TERMINAL | VISITING AREA |
|---|---|
| TERMINAL40-1 | AREA A |
| TERMINAL40-2 | AREA B |
| ... | ... |

SERVICE ;X1

| BASE STATION | POSSIBLE VIM |
|---|---|
| BASE STATION 30-1 | VIM13-1, VIM13-2, VIM13-3 |
| BASE STATION 30-2 | VIM13-2, VIM13-3 |
| BASE STATION 30-3 | VIM13-3 |
| ... | ... |

FIG. 6B

SERVICE ;X2

| BASE STATION | POSSIBLE VIM |
|---|---|
| BASE STATION 30-1 | VIM13-2 |
| BASE STATION 30-2 | VIM13-2, VIM13-3 |
| BASE STATION 30-3 | VIM13-3 |
| ... | ... |

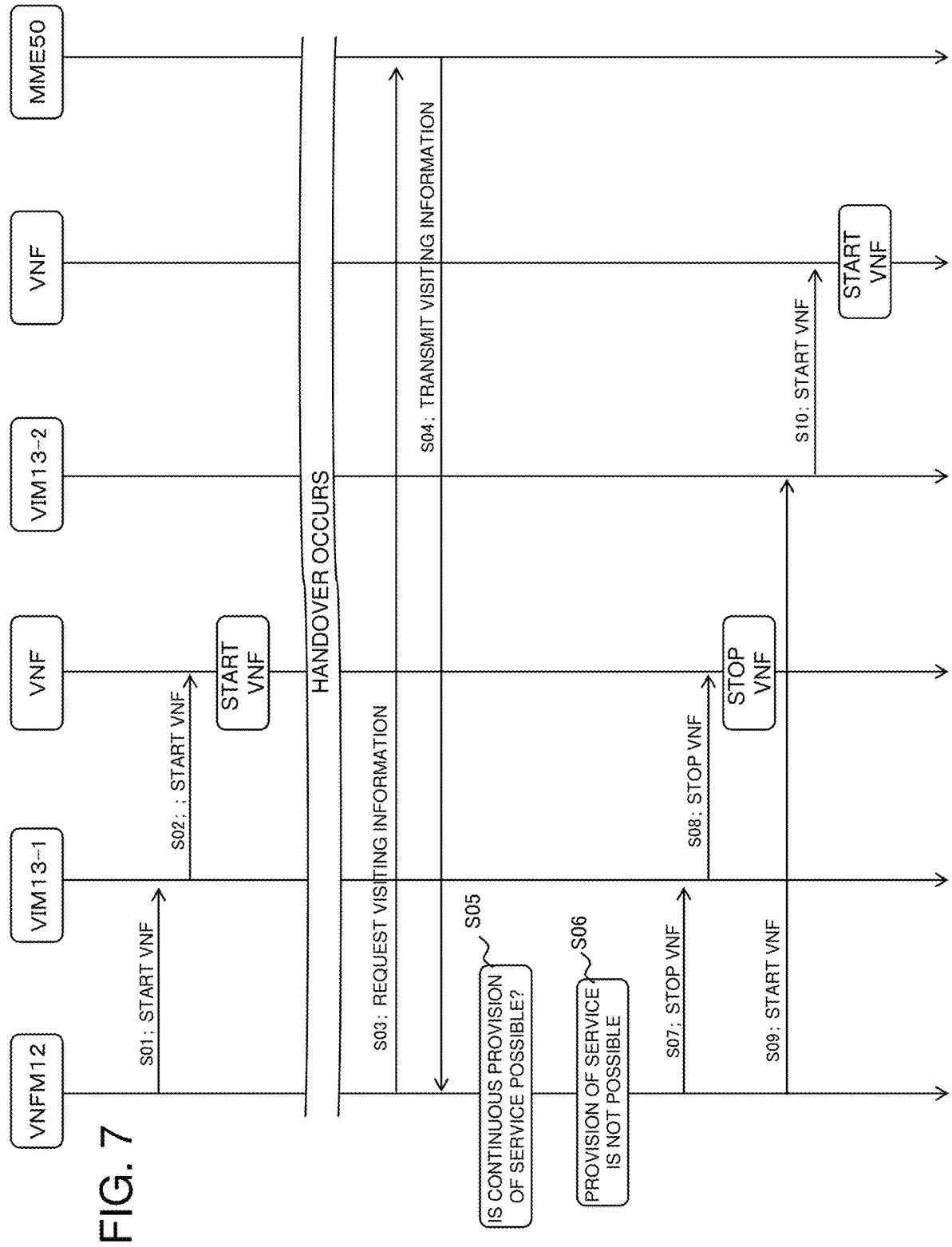

NETWORK FUNCTIONS VIRTUALIZATION MANAGEMENT AND ORCHESTRATION APPARATUS, COMMUNICATION SYSTEM, METHOD, AND PROGRAM

DESCRIPTION ABOUT RELATED APPLICATION

This application is a National Stage of International Application No. PCT/JP2018/011610, filed Mar. 23, 2018, claiming priority to Japanese Patent Application No. 2017-059347 (filed on Mar. 24, 2017), the contents of which application are incorporated herein in its entirety by reference.

FIELD

The present disclosure relates to a network functions virtualization management and orchestration apparatus, a communication system, a method, and a program.

BACKGROUND

There is known network functions virtualization (NFV) that implements functions of network devices or the like in the form of software, by using a virtual machine (VM) implemented in a virtualization layer, such as a hypervisor (HV) on a server (refer to, for example, Non-Patent Literatures (NPL) 1 and 2).

FIG. 10 is a diagram illustrating FIG. 4 in Chapter 7 of Non-Patent Literature 2 in a simplified manner. An overview of a network configuration in a VNF environment is described by using FIG. 10.

FIGS. 6A and 6B

Virtualized Network Functions (VNFs) 22 each correspond to an application or the like configured to operate in a virtual machine (VM) on a server and implements network functions by software. A management function called an element manager (EM) 23 (also referred to as an element manage system (EMS)) is provided for each of the VNFs 22.

A network functions virtualization infrastructure (NFVI) 21 is an infrastructure configured to flexibly use hardware resources, such as computing, storage, and network functions, of a physical machine (PM) 20 as virtualized hardware resources, such as virtual computing, a virtual storage, and a virtual network, virtualized in a virtualization layer, such as a hypervisor.

An NFV orchestrator (NFVO) 11 in an NFV Management and orchestration (NFV-MANO) 10 performs orchestration of resources of the NFVI 21 and lifecycle management of network service (NS) instances (instantiation, scaling, termination, update, and the like of NS instances).

A VNF manager (VNFM) 12 performs lifecycle management of VNF instances (e.g., instantiation, update, query, scaling, termination, and the like) and event notification.

A virtualized infrastructure manager (VIM) 13 performs computing, storage, and network resource management of the NFVI 21, fault monitoring of the NFVI 21, resource monitoring of the NFVI 21, and the like.

Operation supports systems (OSS) in an OSS/BSS 30 is a general term for systems (such as devices, software, and mechanisms) necessary for structuring and operating services by a communication provider (carrier), for example. Business support systems (BSS) is a general term for information systems (such as devices, software, and mechanisms) used for charging and billing of usage fee, customer care, and the like by the communication provider (carrier), for example.

Non-Patent Literature 1: ETSI GS NFV-MAN 001 V1.1.1 (2014 December), Network Functions Virtualisation (NFV); Management and Orchestration, (searched on Mar. 6, 2017) <http://www.etsi.org/deliver/etsi_gs/NFV-MAN/001_099/001/01.01.01_60/gs_NFV-MAN001v010101p.pdf>

Non-Patent Literature 2: ETSI GS NFV 002 V1.2.1 (2014 December), Network Functions Virtualisation (NFV); Architectural Framework, (searched on Mar. 6, 2017) <http://www.etsi.org/deliver/etsi_gs/NFV/001_099/002/01.02.01_60/gs_NFV 002v010201p.pdf>

SUMMARY

Note that the disclosures in the above-mentioned CITATION LIST are incorporated herein by reference. The following analysis has been made by the inventors of the present disclosure.

The above-described MANO system does not hold any terminal visiting information (i.e., location). Hence, the MANO system has a problem that optimal resource allocation taking account of visiting information of a terminal is not possible.

To enable services using a distributed data center (DC), such as mobile edge computing (MEC), in the MANO system, there is no alternative but a holder (system manager) intentionally selects a VIM and/or an NFVI at a timing of initial service deployment to thereby perform arrangement to an optimal location for an application run by each physical machine. However, in a case that a user (terminal) moves from one base station to another base station and consequently a locating area in an initial state is changed to another, there may occur a problem that a service is provided in an area that is not necessarily an optimal area.

Such a problem may be a factor of not being able to satisfy a service level agreement (SLA) in a case of assuming provision of mobile virtual desktop service, video distribution service, dynamic map, and the like, which require high real-time performance. This may be a major problem for service providers.

The present disclosure has a main object to provide a network functions virtualization management and orchestration apparatus, a communication system, a method, and a program that contribute to enabling optimal resource allocation taking account of terminal location.

According to a first aspect, there is provided a network functions virtualization management and orchestration apparatus including a plurality of virtualized infrastructure managers (VIMs) each configured to control start and stop of a virtual network function (VNF) in a virtual machine on each of servers connected to a plurality of respective base stations, a visiting information manager configured to manage visiting information of a terminal wirelessly connected to any of the base stations, and a VNF arrangement controller configured to control arrangement of the VNF providing a service to the terminal, based on VIM management information and the visiting information of the terminal, the VIM management information defining, for each VNF, one or more of the VIMs capable of starting the VNF on each of the servers connected to the base stations.

According to a second aspect, there is provided a communication system including a plurality of base stations, a plurality of servers connected to the plurality of respective base stations, and a network functions virtualization management and orchestration apparatus including a plurality of virtualized infrastructure managers (VIMs) each configured to control start and stop of a virtual network function (VNF) in a virtual machine on each of the servers connected to the plurality of respective base stations. The network functions virtualization management and orchestration apparatus includes a visiting information manager configured to manage visiting information of a terminal wirelessly connected to any of the base stations, and a VNF arrangement controller configured to control arrangement of the VNF providing a service to the terminal, based on VIM management information and the visiting information of the terminal, the VIM management information defining, for each VNF, one or more of the VIMs capable of starting the VNF on each of the servers connected to the base stations.

According to a third aspect, there is provided a network functions virtualization management and orchestration method including, in a communication system including a plurality of base stations, a plurality of servers connected to the plurality of respective base stations, and a network functions virtualization management and orchestration apparatus including a plurality of virtualized infrastructure managers (VIMs) each configured to control start and stop of a virtual network function (VNF) in a virtual machine on each of the servers connected to the plurality of respective base stations, managing visiting information of a terminal wirelessly connected to any of the base stations, and controlling arrangement of the VNF providing a service to the terminal, based on VIM management information and the visiting information of the terminal, the VIM management information defining, for each VNF, one or more of the VIMs capable of starting the VNF on each of the servers connected to the base stations. The present method is tied to a particular machine which is above mentioned network functions virtualization management and orchestration apparatus.

According to a fourth aspect, there is provided a non-transitory computer-readable storage medium that records a program causing a computer mounted on a network functions virtualization management and orchestration apparatus including a plurality of virtualized infrastructure managers (VIMs) each configured to control start and stop of a virtual network function (VNF) in a virtual machine on each of servers connected to a plurality of respective base stations, to execute processing for managing visiting information of a terminal wirelessly connected to any of the base stations, and processing for controlling arrangement of the VNF providing a service to the terminal, based on VIM management information and the visiting information of the terminal, the VIM management information defining, for each VNF, one or more of the VIMs capable of starting the VNF on each of the servers connected to the base stations.

Note that this program may be recoded on a computer-readable storage medium. The storage medium may be a non-transient medium, such as a semiconductor memory, a hard disk, a magnetic recording medium, or an optical recording medium. The present disclosure may also be implemented as a computer program product.

The meritorious effects of the present disclosure are summarized as follows.

It is possible to provide a network functions virtualization management and orchestration apparatus, a communication system, a method, and a program that contribute to enabling optimal resource allocation taking account of terminal location. In other words, the present disclosure converts a network functions virtualization management and orchestration apparatus into one that realizes optimal resource allocation taking account of terminal location.

BRIEF DESCRIPTION OF THE DRAWINGS

FIG. 5 is a diagram illustrating an example of terminal visiting information.

FIGS. 6A and 6B are diagrams illustrating an example of table information held by the NFV-MANO according to the first exemplary embodiment.

FIG. 7 is a sequence diagram illustrating an example of operations of the communication system according to the first exemplary embodiment.

MODES

Figure 1:
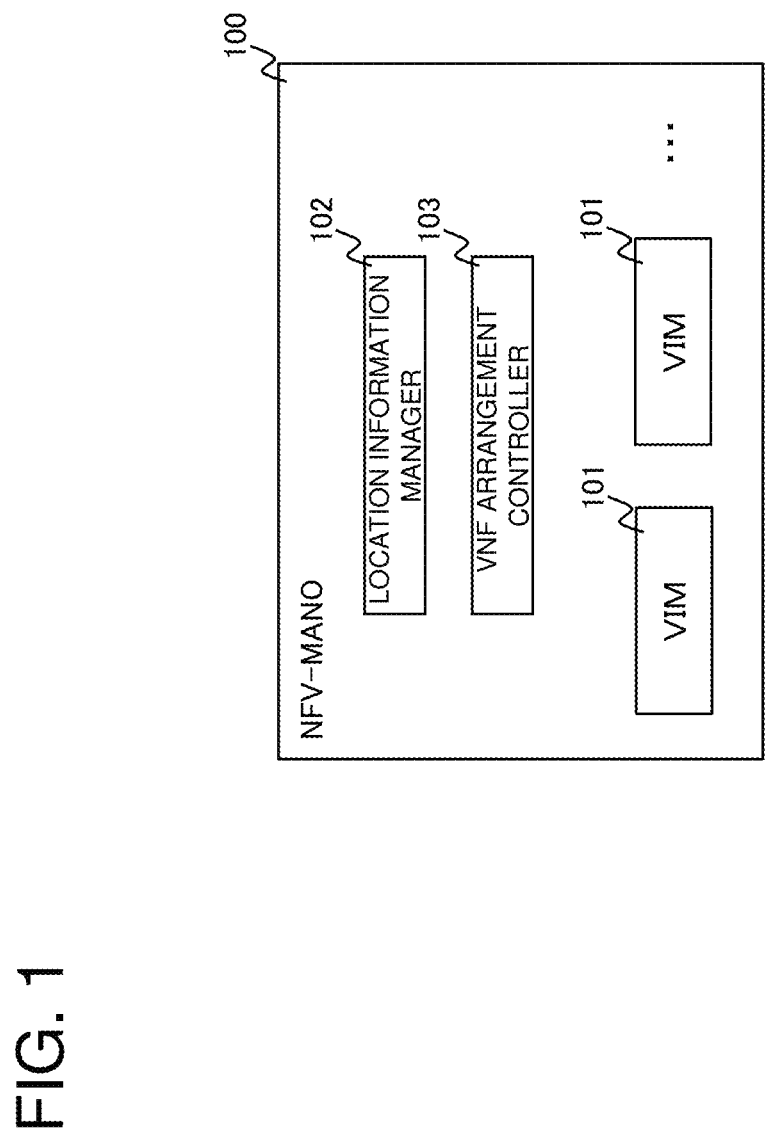
FIG. 1 is a diagram for illustrating an outline of one exemplary embodiment.

First, an outline of one exemplary embodiment is described. Note that the reference signs in the drawings added in this outline are given, as an example, to elements for convenience for the sake of better understanding, and the description of this outline is not intended to provide any particular limitation.

A network functions virtualization management and orchestration apparatus (NFV-MANO) 100 according to the one exemplary embodiment includes a plurality of VIMs 101, a visiting information manager 102, and a VNF arrangement controller 103 (refer to FIG. 1). The plurality of VIMs 101 are each configured to control start and stop of virtual network functions (VNFs) in virtual machines on servers each connected to a corresponding one of the plurality of base stations. The visiting information manager 102 is configured to manage visiting information of each terminal wirelessly connecting to any of the base stations. The VNF arrangement controller 103 is configured to control arrangement of each of the VNFs to provide a service to each terminal, based on VIM management information and terminal visiting information, the VIM management information defining, for each VNF, a VIM(s) capable of starting the VNF on each of the servers connected to the base stations.

The network functions virtualization management and orchestration apparatus 100 is configured to collect terminal visiting information through a VNFM and/or an NFVO, for example. The VNFM and the NFVO are configured to determine whether continuous provision of a service to the terminal is possible, with reference to the collected terminal visiting information and VIM management information, and to rearrange the VNF when continuous provision of the service is not possible (the service is not provided by an expected VIM). Consequently, optimal resource allocation taking account of terminal location is enabled.

Concrete exemplary embodiments are described below in further detail with reference to the drawings. Note that the same constituent components in the exemplary embodiments are denoted by the same reference signs, and descriptions thereof are omitted. Connecting lines between the blocks in each diagram include both bidirectional and unidirectional connecting lines. Each one-direction arrow schematically indicates a main flow of a signal (data) and is not intended to exclude bidirectional flows. In addition, an input port and an output port exist respectively at an input end and an output end of each connecting line although explicit illustrations thereof are omitted in circuit diagrams, block diagrams, inner configuration diagrams, connection diagrams, and the like illustrated in the disclosure of the present application. The same applies to input/output interfaces.

First Exemplary Embodiment

A first exemplary embodiment is described in more detail by using drawings.

Figure 2:
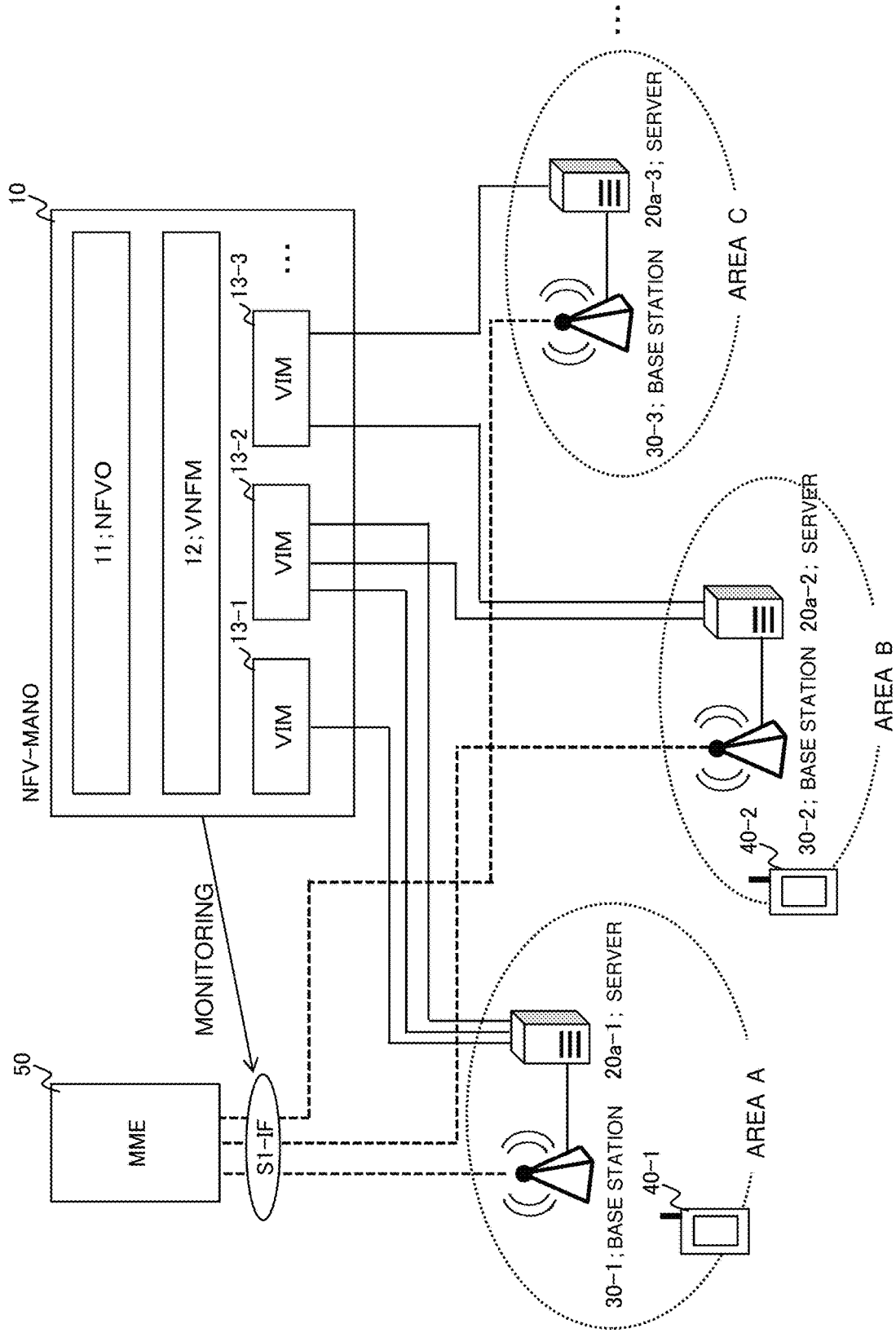
FIG. 2 is a diagram illustrating a configuration example of a communication system according to a first exemplary embodiment.

FIG. 2 is a diagram illustrating a configuration example of a communication system according to a first exemplary embodiment. With reference to FIG. 2, the communication system includes an NFV-MANO 10, a plurality of servers 20a, a plurality of base stations 30, a plurality of terminals 40, and a mobility management entity (MME) 50.

The NFV-MANO 10 is an apparatus provided at a central site. Each of the servers 20a and a corresponding one of the base stations 30 are apparatuses connected to each other as a combination and provided at a local site or the like. The NFV-MANO 10 provided at the central site and each of the servers 20a provided at the local sites are connected via a network.

Each of the base stations 30 is configured to provide wireless connection to the terminals 40. In FIG. 2, a range in which each of the base stations 30 is able to accommodate the terminals 40 (each of areas A to C) is indicated by dotted lines.

Each of the base stations 30 is connected to the MME 50 configured to process control signaling in a mobile network. The NFV-MANO 10 is configured to be able to monitor control signals between the MME 50 and the base stations through an S1-interface (IF). In other words, by monitoring signals between the base stations 30 and the MME 50, the NFV-MANO 10 can detect a fact that the terminal 40 has performed handover and the locating area of the terminal 40 is changed. Note that monitoring signals between base stations and an MME and thereby detecting handover of a terminal is defined in existing Third Generation Partnership Project (3GPP) specifications, and hence any particular measures are not needed in the MME and the base station. Moreover, the operations do not increase load of the base stations and the like.

The NFV-MANO 10 is a network functions virtualization management and orchestration apparatus including an NFV orchestrator (NFVO) 11, a VNF manager (VNFM) 12, and virtualized infrastructure managers (VIMs) 13.

The NFVO 11, the VNFM 12, and the VIMs 13 are functional entities that perform network system management. The NFVO 11 is configured to enable network services on the NFVI 21. The VNFM 12 is configured to manage VNF lifecycle. Each VIM 13 is an entity that generates, in accordance with control by the NFVO 11 and/or the VNFM 12, a virtual machine (VM) and a VNF on the server(s) (physical machine(s) (PM(s))) 20a. The VIM 13 is configured to perform resource management and control for the NFVI providing an infrastructure for performing VNF virtualized by implementation using software operating on the corresponding virtual machine. In the example in FIG. 2, the plurality of VIMs 101 are each configured to control start and stop of VNFs in virtual machines on servers each connected to a corresponding one of the plurality of base stations 30.

Figure 10:
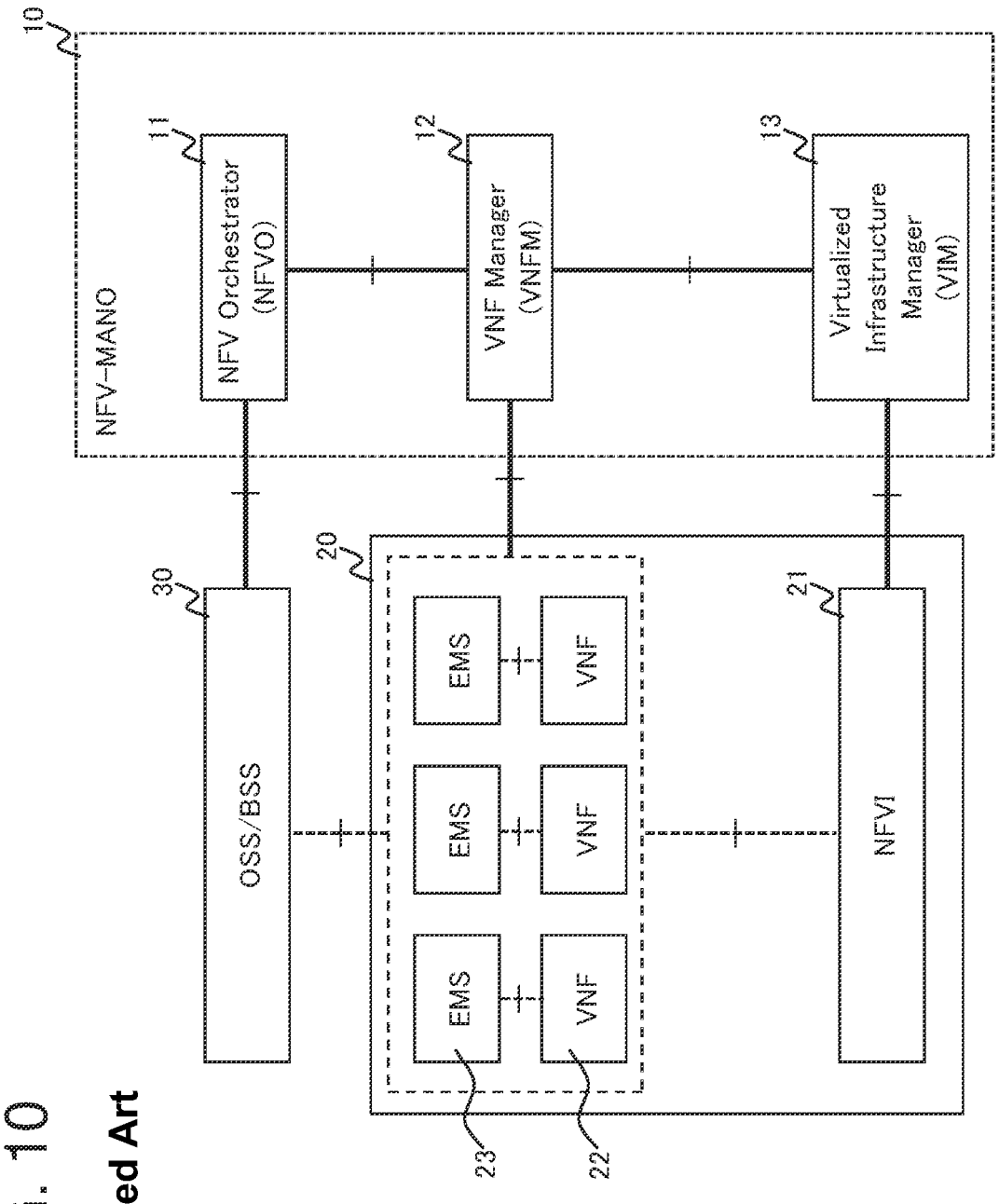
FIG. 10 is a diagram illustrating FIG. 4 in Chapter 7 of Non-Patent Literature 2 in a simplified manner.

Each of the servers 20a provided at the local site with the corresponding base station 30 in combination is an apparatus corresponding to the physical machine 20 described in FIG. 10. In the communication system in FIG. 2, each virtual machine VM is generated in each of the servers 20a by the NFV-MANO 10 through the NFVI 21 of the corresponding server 20a (refer to FIG. 10). The VNF is started on the generated virtual machine VM, and a service is provided to the terminal 40 connected to the base station 30.

Hardware Configuration

Figure 3:
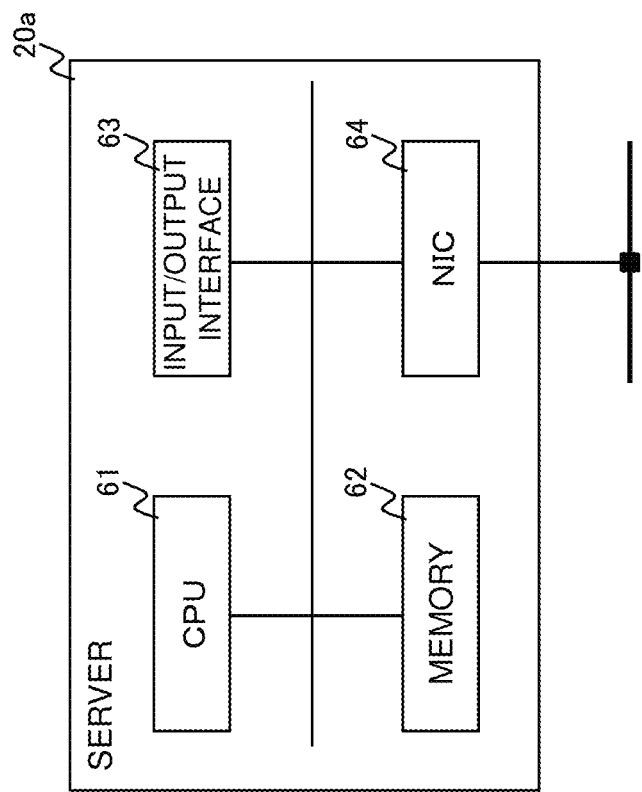
FIG. 3 is a block diagram illustrating an example of a hardware configuration of a server according to the first exemplary embodiment.

FIG. 3 is a block diagram illustrating an example of a hardware configuration of the server 20a according to the first exemplary embodiment.

The server 20a is a so-called information processing apparatus (computer) and has the configuration illustrated in FIG. 3. For example, the server 20a includes a central processing unit (CPU) 61, a memory 62, an input/output interface 63, a network interface card (NIC) 64, which is a communication means, and the like connected to each other through an internal bus.

Note that the configuration illustrated in FIG. 3 is not intended to limit the hardware configuration of the server 20a. The server 20a may include unillustrated hardware. The number of CPUs and the like included in the server 20a is not intended to be limited to that illustrated in FIG. 3 and a plurality of CPUs may alternatively be included in the server 20a, for example.

The memory 62 includes one or more of a random access memory (RAM), a read only memory (ROM), an auxiliary storage device (such as a hard disk), and the like. The input/output interface 63 is a component to serve as an interface with an unillustrated display device and/or input device. The display device is a liquid crystal display or the like, for example. The input device is a device that accepts user operations through a keyboard, a mouse, or the like, for example.

Note that the NFV-MANO 10 may also be implementable with a computer. In such a case, the hardware configuration is basically the same as the configuration of the above-described server 20a, which is apparent to a person skilled in the art, and hence a description thereof is omitted. Moreover, hardware configurations of the base stations 30, the terminals 40, the MME 50 are also apparent to a person skilled in the art, and descriptions thereof are omitted.

Functions of the NFV-MANO 10 are implemented by processing modules to be described later. The processing modules are implemented by a CPU executing a program stored in a memory, for example. The program can be updated through download via the network or by using a storage medium having stored thereon the program. Alternatively, the processing modules may be implemented by a semiconductor chip. In other words, the functions performed by the processing modules may be implemented with a kind of hardware and/or software.

Processing Configuration

Next, a processing configuration of the NFV-MANO 10 is described.

Figure 4:
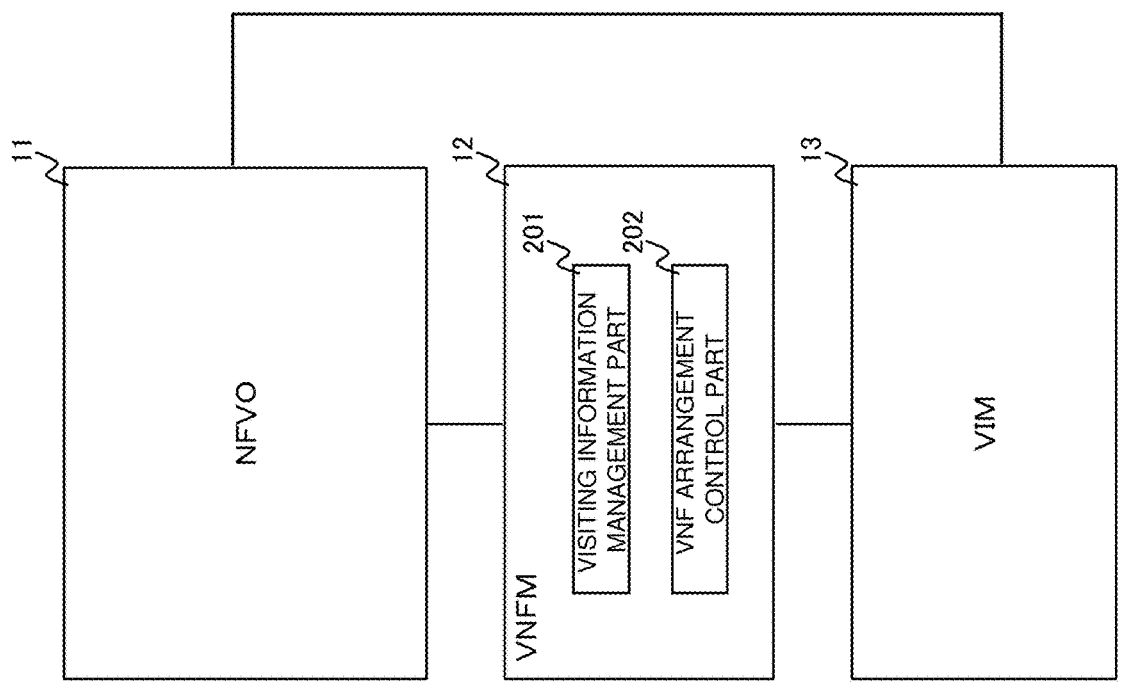
FIG. 4 is a diagram for illustrating an NFV-MANO according to the first exemplary embodiment in terms of functions.

FIG. 4 is a diagram for illustrating the NFV-MANO 10 according to the first exemplary embodiment in terms of functions. Note that, in FIG. 4, one of the plurality of VIMs 13 included in the NFV-MANO 10 is illustrated as a representation.

With reference to FIG. 4, the VNFM 12 includes a visiting information management part (corresponding to the visiting information manager) 201 and a VNF arrangement control part (corresponding to the VNF arrangement controller) 202. In other words, the visiting information management part 201 and the VNF arrangement control part 202 may be implemented by the VNFM 12 configured to manage VNF lifecycle.

The visiting information management part 201 is a component that manages visiting information of each of the terminals 40 wirelessly connecting to the base stations 30. The visiting information management part 201 is configured to generate the visiting information of the terminal, based on information from the MME 50. The visiting information management part 201 is configured to monitor the S1-IF between the base stations 30 and the MME 50 to manage visiting information of the terminals 40. More specifically, the visiting information management part 201 is configured to periodically transmit a "visiting information request" to the MME 50 and acquire, through a response to the request, the latest visiting information of the terminals 40. The visiting information request is a request for the MME 50 about provision of information of the base station 30 to which each of the terminals 40 is connected.

The visiting information management part 201 is configured to manage the visiting information of the terminals 40 (information of connections with the base stations) by using table information as that illustrated in FIG. 5. Note that, in the following description, information for managing visiting information of the terminals 40 is referred to as "terminal visiting information".

The visiting information management part 201 is configured to detect handover of any of the terminals 40 through the terminal visiting information and also notify the VNF arrangement control part 202 that the visiting information of the terminal 40 is changed. For example, the visiting information management part 201 is configured to notify, in a case that the terminal visiting information is updated based on a response from the MME 50, the VNF arrangement control part 202 that the visiting information is changed.

The VNF arrangement control part 202 is a component that controls arrangement of a VNF by each of the VIMs 13. The VNF arrangement control part 202 is configured to control arrangement of the VNF that provides a service to the terminal 40, based on VIM management information and terminal visiting information, the VIM management information defining, for each VNF, one or more of the VIMs 13 capable of starting the VNF on each of the servers 20a connected to the base stations 30. Note that details of the VIM management information are described later.

The VNF arrangement control part 202 is configured to determine, based on the above two kinds of information, whether or not the VNFs providing services to the terminals 40 are appropriately arranged to the VIMs and request, by specifying any of the VNFs as necessary, the corresponding one of the VIMs 13 to start or stop of the VNF.

Here, each VIM 13 that manages and controls the server(s) 20a provided in combination with corresponding base station(s) 30 is determined in advance. In the example in FIG. 2, the server 20a-1 connected to the base station 30-1 is managed and controlled by the VIMs 13-1 to 13-3, and the server 20a-2 connected to the base station 30-2 is managed and controlled by the VIMs 13-2 and 13-3. Moreover, VNF(s) that can be deployed to each of the servers 20a (virtual machines) (i.e., services that can be provided to each of the terminals 40) by the VIMs 13 is also defined in advance.

Combinations of a service possible to be provided to the terminals 40, a base station, and a VIM possible to provide the service are managed as the table information by the NFV-MANO 10. For example, the combinations of a service, a base station 30, and the VIM(s) 13 are managed by the table information as that illustrated in FIGS. 6A and 6B. Note that, in the following description, the table information as that illustrated in FIGS. 6A and 6B is referred to as "VIM management information". Note that the VIM management information can be used by the NFV-MANO 10 by defining the VIM management information in an NFV service descriptor in advance. Note that the VIM management information may be understood as a list, for each locating area of the terminals 40 (more specifically, for each of the servers 20a each provided in combination with one of the base stations 30), of VIMs 13 capable of allowing deployment of service instances (VNF) provided to the terminal.

With reference to FIG. 6A, it is understood that any VIM of the VIMs 13-1 to 13-3 is capable of providing a service X1 through the server 20a-1 connected to the base station 30-1. In other words, any VIM of the VIMs 13-1 to 13-3 can start the VNF related to the service X1 on the virtual machine VM structured on the server 20a-1. In contrast, with reference to FIG. 6B, it is understood that only the VIM 13-2 can provide a service X2 through the server 20a-1 connected to the base station 30-1. As described above, the VIM management information is information defined, for each VNF (service), a VIM(s) capable of starting (capable of deploying) the VNF on each of the servers 20a connected to the base stations 30.

The VNF arrangement control part 202 is configured to determine whether or not provision of the service to the terminals 40 is possible, based on the terminal visiting information and the VIM management information, and control VNF arrangement as needed. More specifically, the VNF arrangement control part 202 refers to the terminal visiting information (refer to FIG. 5) and the VIM management information (refer to FIGS. 6A and 6B), to determine whether or not the location of the terminal 40 and the arrangement of the VNF for providing the service (VIM resource) are appropriate.

For example, in FIG. 2, assume that the service X1 is provided to the terminal 40-1. Assume also that the terminal 40-1 is located in the area A, the VIM capable of providing the service X1 to the terminal 40 located in this area is any of the VIM 13-1 to VIM 13-3 (refer to FIG. 6A). Here, it is assumed that the VNF for providing the service X1 to the terminal 40-1 has been started and managed by the VIM 13-1.

In FIG. 2, the terminal 40-1 moves and is handed over from the base station 30-1 (area A) to the base station 30-2 (area B). The fact of the handover is detected by the visiting information management part 201, and the terminal visiting information in FIG. 5 is updated accordingly. As described above, when the terminal visiting information is changed, the visiting information management part 201 notifies the VNF arrangement control part 202 of the change.

Upon receipt of the notification, the VNF arrangement control part 202 determines whether continuous provision of the service provided before the handover is possible through the server 20a-2 connected to the base station 30-2, which is a handover destination (i.e., the destination of the move of the terminal 40). In the above-described example, the VNF arrangement control part 202 determines whether or not provision of the service X1 to the terminal 40-1 handed over to the base station 30-2 is possible.

With reference to FIG. 6A, it is understood that only the VIM 13-2 or the VIM 13-3 is capable of starting the VNF corresponding to the service X1 at the base station 30-2 (server 20a-2 connected to this base station) and that the VIM 13-1 is not capable of this. In other words, when the terminal 40-1 is handed over to the base station 30-2, provision of the service X1 is not possible by using the resources managed by the VIM 13-1.

In a case that the VNF arrangement control part 202 determines that continuous provision of the service is not possible through the server 20a connected to the handover-destination base station 30 as described above, the VNF arrangement control part 202 instructs the corresponding VIM 13 to stop the VNF that used to provide the service to the terminal 40 at the handover source. In the above-described example, the VNF arrangement control part 202 requests the VIM 13-1 to stop the VNF corresponding to the service X1 on the server 20a-1 connected to the base station 30-1.

Thereafter, the VNF arrangement control part 202 selects the VIM 13 capable of starting the VNF corresponding to the service X1 on the server 20a-2 connected to the handover-destination base station 30-2 and instructs the selected VIM 13 to start the VNF. Specifically, either the VIM 13-2 or the VIM 13-3 is selected and is requested to start the specified VNF.

As described above, when provision of the service provided through the server 20a-1 connected to the handover-source base station 30-1 is not possible through the server 20a-2 connected to the handover-destination base station 30-2, the VNF arrangement control part 202 performs rearrangement of the VNF corresponding to the service that used to be provided. In this event, the VNF arrangement control part 202 requests the server 20a-1 to stop the VNF corresponding to the service that used to be provided and requests the server 20a-2 to start the VNF corresponding to the service that used to be provided.

Next, with reference to FIG. 7, operations of the communication system according to the first exemplary embodiment are described. In FIG. 7, as in the above example, a description is given of operations in a case that the service X1 is provided to the terminal 40-1 and the terminal 40-1 is handed over from the base station 30-1 to the base station 30-2.

In Step S01, in response to a request from the EMS 23 or the like, the VNFM 12 requests the VIM 13-1 to start the VNF corresponding to the service X1.

The VIM 13-1 starts the VNF through the NFVI 21 of the server 20a-1 (Step S02). Specifically, the VIM 13-1 sets an image file and/or a unique parameter of the VNF to perform instantiation (VNF to provide the service X1), in the server 20a-1, to thereby start the VNF.

Thereafter, the terminal 40-1 provided with the service X1 is handed over to the base station 30-2 corresponding to the area B.

The visiting information management part 201 of the VNFM 12 periodically transmits a visiting information request to the MME 50 and acquires the latest visiting information of the terminals 40 (Step S03). Specifically, the visiting information management part 201 periodically requests the MME 50 connected to the plurality of base stations 30, to transmit information of the base stations 30 to which the terminals 40 are connected.

The MME 50 transmits information of the base stations 30 connected to the terminals 40, to the VNFM 12 (Step S04). Consequently, the fact of the handover that has occurred previously is detected by the VNFM 12. In this case, since the terminal visiting information is changed, the visiting information management part 201 notifies the VNF arrangement control part 202 of the change.

The VNF arrangement control part 202 determines whether or not continuous provision of the service X1 is possible to the terminal 40 that has handed over previously, based on the terminal visiting information and the VIM management information (Step S05).

Here, since the VNF corresponding to the service X1 is not able to be provided by the VIM 13-1 through the server 20a-2 connected to the handover-destination base station 30-2, it is determined that continuous provision of the service is not possible (Step S06).

Note that, in a case that continuous provision of the service X1 is possible through the handover-destination server 20a even when the terminal 40 has been handed over, the VNF arrangement control part 202 does not perform any particular processing.

The VNF arrangement control part 202 of the VNFM 12 requests the VIM 13-1 managing the VNF corresponding to the service X1, to stop the VNF (Step S07).

The VIM 13-1, which has received the request, stops the specified VNF (Step S08).

Upon completion of the stopping of the specified VNF, the VIM 13-1 notifies the VNFM 12 of the completion. Upon receipt of the notification, the VNF arrangement control part 202 requests the VIM 13 capable of starting the VNF corresponding to the service X1 on the server 20a-2 connected to the handover-destination base station 30-2, to start the VNF (Step S09). In the example in FIG. 7, the VIM 13-2 is selected.

The VIM 13-2 starts the specified VNF on the server 20a-2 (Step S10).

As described above, in the operation example illustrated in FIG. 7, the VNFM 12 constantly collects visiting information of the terminals 40 (polls visiting information) in real time. The VNFM 12 periodically checks, based on the visiting information and the predetermined VIM management information, whether or not the VNF providing a corresponding service is arranged to a resource under the control of any of the expected VIMs 13. If the service is not provided under the control of any of the expected VIMs 13, the VNFM 12 performs dynamic rearrangement of the VNF providing the service. As a result, continuous provision of the service to the terminal 40 is enabled, which ensures a required SLA.

Note that the configurations and operations of the communication system and the like described in the above exemplary embodiment are examples, and various changes are possible to be made.

Figure 8:
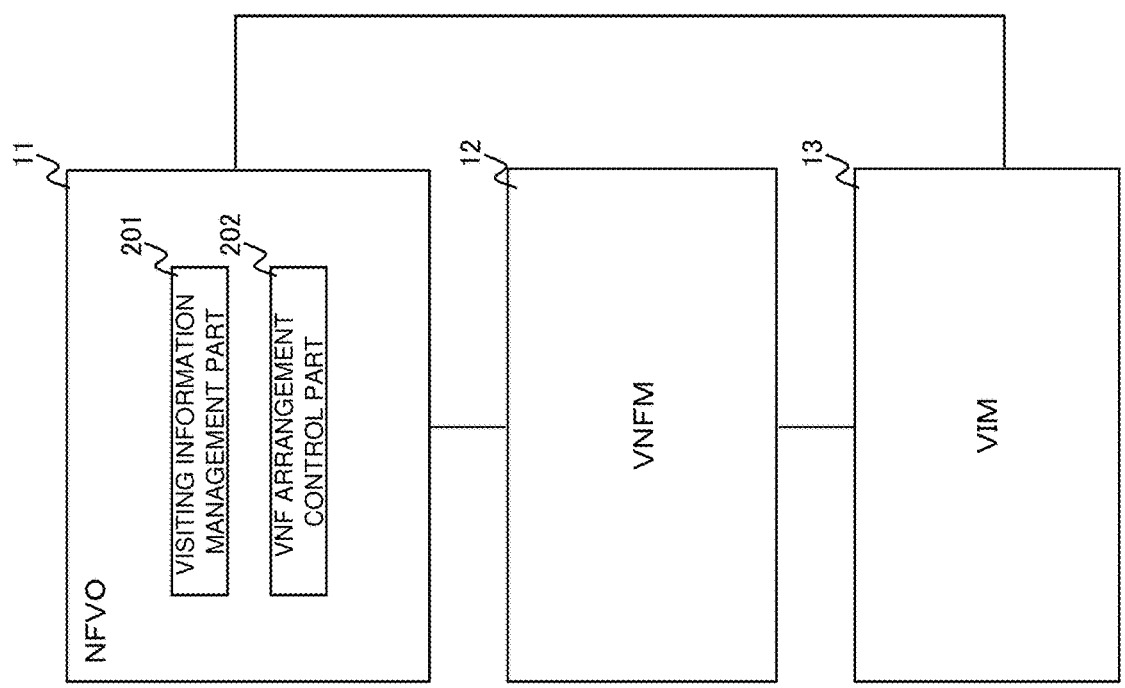
FIG. 8 is a diagram illustrating another example for describing the NFV-MANO according to the first exemplary embodiment in terms of functions.

For example, as illustrated in FIG. 8, the visiting information management part 201 and the VNF arrangement control part 202 may be implemented in the NFVO 11. In other words, the visiting information management part 201 and the VNF arrangement control part 202 may be implemented by an NFVO implementing network services.

Figure 9:
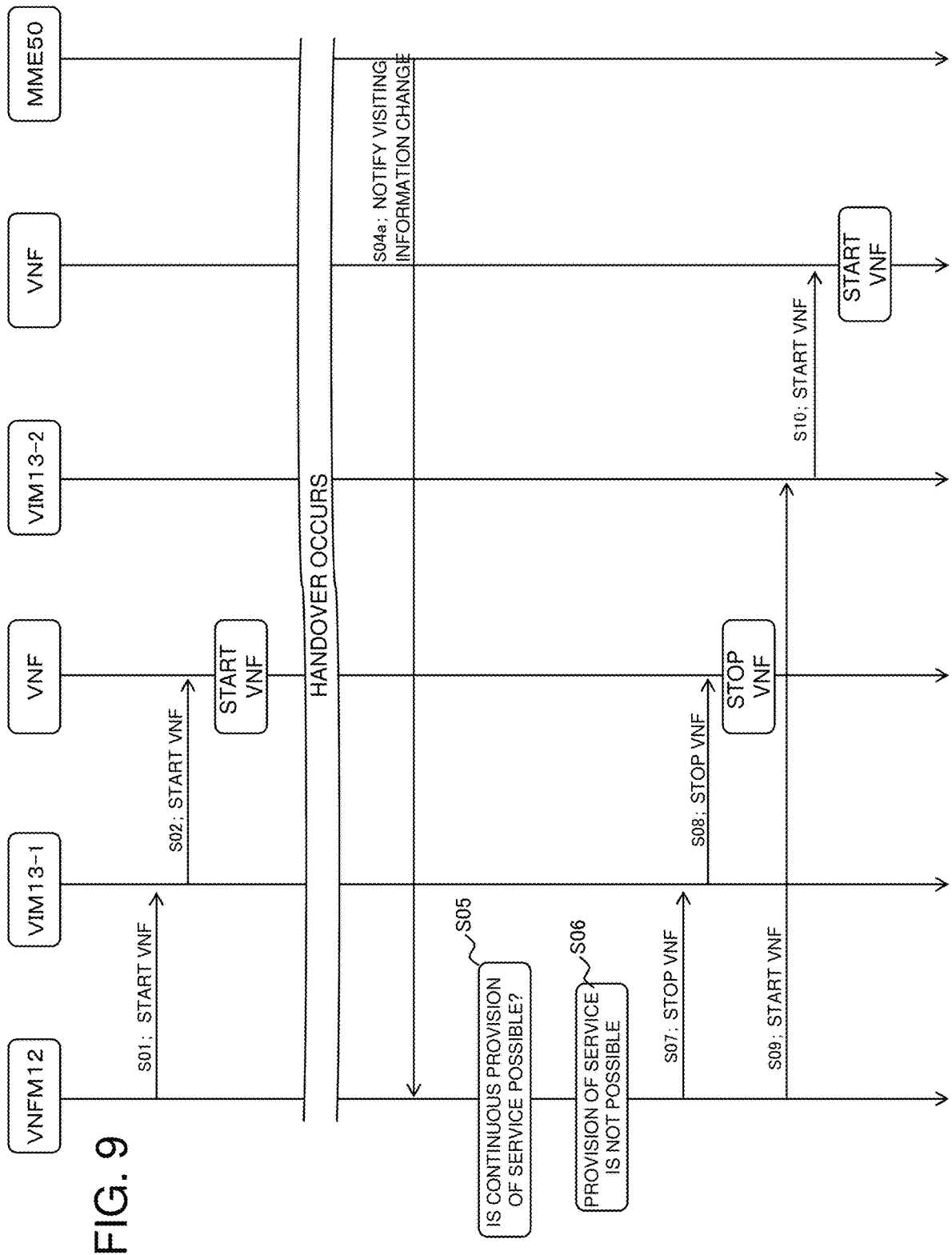
FIG. 9 is a sequence diagram illustrating another example of the operations of the communication system according to the first exemplary embodiment.

Instead of the NFV-MANO 10 requesting the MME 50 to provide information as in the above-described exemplary embodiment, the MME 50 may notify the NFV-MANO 10 of a change of visiting information. Specifically, as illustrated in FIG. 9, upon change of the base station 30 to which one of the terminals 40 is connected, the MME 50 may transmit, to the visiting information management part 201, information of the base station to which the terminal 40 is connected. The visiting information management part 201 may then generate terminal visiting information, based on the information acquired from the MME 50. In this way, the MME 50 may detect a change in the visiting information due to handover of the terminal 40 and transmit, upon occurrence of the change, a visiting information change notification to the NFV-MANO 10 (Step S04a).

In the operation example illustrated in FIG. 9, the VNFM 12/NFVO 11 receives the visiting information change notification about the terminal 40 from an evolved packet core (EPC) application (MME 50). Upon receipt of the notification, the VNFM 12/NFVO 11 checks whether or not the VNF providing a corresponding service is arranged to a resource under the control of any of the expected VIMs 13. If the service is not provided under the control of any of the expected VIMs 13, the VNFM 12/NFVO 11 performs dynamic rearrangement of the VNF providing the service. As a result, continuous provision of the service to the terminal 40 is enabled, which ensures a required SLA.

Note that, although a description has been given of a case, in the above-described exemplary embodiment, that VNF instances and the terminals 40 have one-to-one correspondence, the VNF instances and the terminals 40 may have one-to-N (N is a positive integer) correspondence. Specifically, it is normally hard to imagine that resources of the server 20a run short in providing a service to a single terminal 40, and resource shortages are noticeable in providing a service to a number of terminals 40. In view of this, the number of terminals 40 that can be accommodated may be determined in advance for each VNF (each service), and when the predetermined number of terminals are centered on a single VNF due to handover of the terminals 40 or the like, the VNF may be rearranged to any of the servers 20a capable of accommodating a greater number of terminals 40.

As described above, in the communication system according to the first exemplary embodiment, the VNF 12 or the NFVO 11 cooperates with the MME 50 (EPC application) to thereby store the visiting information of the terminals 40 in an accessible storage medium. The VNFM 12 or the NFVO 11 refers to the VIM management information and determines whether continuous provision of a service to a terminal is possible, to thereby perform, when continuous provision of the service is not possible (the service is not provided by any of the expected VIMs 13), rearrangement of the VNF. Consequently, optimal resource allocation taking account of location (visiting information) of the terminals 40 is enabled.

A part or the whole of above-described exemplary embodiments can be described as, but is not limited to, the following.

Mode 1

The network functions virtualization management and orchestration apparatus according to the above-described first aspect.

Mode 2

The network functions virtualization management and orchestration apparatus according to Mode 1, in which the visiting information manager detects handover of the terminal, based on the visiting information of the terminal, and notifies the VNF arrangement controller that the visiting information of the terminal is changed, and when a service provided through a first server connected to a handover-source base station is not able to be provided through a second server connected to a handover-destination base station, the VNF arrangement controller performs rearrangement of the VNF corresponding to the service that used to be provided.

Mode 3

The network functions virtualization management and orchestration apparatus according to Mode 2, in which the VNF arrangement controller requests the first server to stop the VNF corresponding to the service that used to be provided and requests the second server to start the VNF corresponding to the service that used to be provided.

Mode 4

The network functions virtualization management and orchestration apparatus according to any one of Modes 1 to 3, in which the visiting information manager and the VNF arrangement controller are implemented by a VNF manager (VNFM) configured to manage lifecycle of the VNF.

Mode 5

The network functions virtualization management and orchestration apparatus according to any one of Modes 1 to 3, in which the visiting information manager and the VNF arrangement controller are implemented by an NFV-orchestrator (NFVO) configured to implement a network service.

Mode 6

The network functions virtualization management and orchestration apparatus according to any one of Modes 1 to 5, in which the visiting information manager periodically requests a mobility management entity (MME) connected to the plurality of base stations, to transmit information of the base station to which the terminal is connected, and generates the visiting information of the terminal, based on a response acquired from the MME.

Mode 7

The network functions virtualization management and orchestration apparatus according to any one of Modes 1 to 5, in which a mobility management entity (MME) connected to the plurality of base stations transmits, when the base station to which the terminal is connected is changed, information of the base station to which the terminal is connected, to the visiting information manager, and the visiting information manager generates the visiting information of the terminal, based on the information acquired from the MME.

Mode 8

The communication system according to the above-described second aspect.

Mode 9

The network functions virtualization management and orchestration method according to the above-described third aspect.

Mode 10

The program according to the above-described fourth aspect.

Note that Modes 8 to 10 can be developed with Mode 2 to Mode 7, as the case of Mode 1.

Note that the cited disclosures in the above-mentioned CITATION LIST are incorporated herein by reference. Making changes and adjustment of the exemplary embodiments or examples is allowed within the framework of the entire disclosure (including the scope of the claims) of the present disclosure, and also based on a basic technical concept of the present disclosure. Further, various combinations or selections of various disclosed elements (including each element of each claim, each element of each exemplary embodiment or example, each element of each drawing, and the like) are allowed within the framework of the entire disclosure of the present disclosure. Specifically, as a matter of course, the present disclosure encompasses various modifications and amendments that may be achieved by a person skilled in the art based on the entire disclosure including the scope of the claims and the technical concept. Regarding a numerical range described herein, in particular, it should be interpreted that any numerical value or any smaller range included within the range is specifically described even without particular description.

REFERENCE SIGNS LIST

10 NFV-MANO
11 NFVO
12 VNFM
13, 13-1 to 13-3, 101 VIM
20 Physical machine
20a, 20a-1 to 20a-3 Server
21 NFVI
22 VNF
23 EMS
30, 30-1 to 30-3 Base station
40, 40-1, 40-2 Terminal
50 MME
61 CPU
62 Memory
63 Input/output interface
64 NIC
100 Network functions virtualization management and orchestration apparatus
102 Visiting information manager
103 VNF arrangement controller
201 Visiting information management part
202 VNF arrangement control part

The invention claimed is:

1. A network functions virtualization management and orchestration apparatus comprising:
a plurality of virtualized infrastructure managers (VIMs) each configured to control start and stop of a virtual network function (VNF) in a virtual machine on each of servers connected to a plurality of respective base stations;
at least a processor; and
a memory in circuit communication with the processor, wherein the processor is configured to execute program instructions stored in the memory to implement:
a visiting information manager to manage visiting information of a terminal wirelessly connected to any of the base stations; and
a VNF arrangement controller configured to control arrangement of the VNF providing a service to the terminal, based on VIM management information and the visiting information of the terminal, the VIM management information defining, for each VNF, one or more of the VIMs capable of starting the VNF on each of the servers connected to the base stations,
wherein
the visiting information manager detects handover of the terminal, based on the visiting information of the terminal, and notifies the VNF arrangement controller that the visiting information of the terminal is changed, and
when a service provided through a first server connected to a handover-source base station is not able to be provided through a second server connected to a handover-destination base station, the VNF arrangement controller performs rearrangement of the VNF corresponding to the service that used to be provided.

2. The network functions virtualization management and orchestration apparatus according to claim 1, wherein the VNF arrangement controller requests the first server to stop the VNF corresponding to the service that used to be provided and requests the second server to start the VNF corresponding to the service that used to be provided.

3. The network functions virtualization management and orchestration apparatus according to claim 1, wherein the visiting information manager and the VNF arrangement controller are implemented by a VNF manager (VNFM) configured to manage lifecycle of the VNF.

4. The network functions virtualization management and orchestration apparatus according to claim 1, wherein the visiting information manager and the VNF arrangement controller are implemented by an NFV-orchestrator (NFVO) configured to implement a network service.

5. The network functions virtualization management and orchestration apparatus according to claim 1, wherein the visiting information manager periodically requests a mobility management entity (MME) connected to the plurality of base stations, to transmit information of the base station to which the terminal is connected, and generates the visiting information of the terminal, based on a response acquired from the MME.

6. The network functions virtualization management and orchestration apparatus according to claim 1, wherein
a mobility management entity (MME) connected to the plurality of base stations transmits, when the base station to which the terminal is connected is changed, information of the base station to which the terminal is connected, to the visiting information manager, and
the visiting information manager generates the visiting information of the terminal, based on the information acquired from the MME.

7. A communication system comprising:
a plurality of base stations;
a plurality of servers connected to the plurality of respective base stations; and
a network functions virtualization management and orchestration apparatus including a plurality of virtualized infrastructure managers (VIMs) each configured to control start and stop of a virtual network function (VNF) in a virtual machine on each of the servers connected to the plurality of respective base stations, wherein
the network functions virtualization management and orchestration apparatus includes
at least a processor; and
a memory in circuit communication with the processor, wherein the processor is configured to execute program instructions stored in the memory to implement:
a visiting information manager to manage visiting information of a terminal wirelessly connected to any of the base stations and
a VNF arrangement controller to control arrangement of the VNF providing a service to the terminal, based on VIM management information and the visiting information of the terminal, the VIM management information defining, for each VNF, one or more of the VIMs capable of starting the VNF on each of the servers connected to the base stations
wherein
the visiting information manager detects handover of the terminal, based on the visiting information of the terminal, and notifies the VNF arrangement controller that the visiting information of the terminal is changed, and
when a service provided through a first server connected to a handover-source base station is not able to be provided through a second server connected to a handover-destination base station, the VNF arrangement controller performs rearrangement of the VNF corresponding to the service that used to be provided.

8. A network functions virtualization management and orchestration method comprising, in a communication system including
a plurality of base stations,
a plurality of servers connected to the plurality of respective base stations, and
a network functions virtualization management and orchestration apparatus including a plurality of virtualized infrastructure managers (VIMs) each configured to control start and stop of a virtual network function (VNF) in a virtual machine on each of the servers connected to the plurality of respective base stations:
managing visiting information of a terminal wirelessly connected to any of the base stations;
detecting handover of the terminal, based on the visiting information of the terminal;
controlling arrangement of the VNF providing a service to the terminal, based on VIM management information and the visiting information of the terminal, the VIM management information defining, for each VNF, one or more of the VIMs capable of starting the VNF on each of the servers connected to the base stations; and
performing rearrangement of the VNF corresponding to the service that used to be provided when a service provided through a first server connected to a handover-source base station is not able to be provided through a second server connected to a handover-destination base station.

9. The network functions virtualization management and orchestration apparatus according to claim 1, wherein the visiting information manager and the VNF arrangement controller are implemented by a VNF manager (VNFM) configured to manage lifecycle of the VNF.

10. The network functions virtualization management and orchestration apparatus according to claim 2, wherein the visiting information manager and the VNF arrangement controller are implemented by a VNF manager (VNFM) configured to manage lifecycle of the VNF.

11. The network functions virtualization management and orchestration apparatus according to claim 1, wherein the visiting information manager and the VNF arrangement controller are implemented by an NFV-orchestrator (NFVO) configured to implement a network service.

12. The network functions virtualization management and orchestration apparatus according to claim 2, wherein the visiting information manager and the VNF arrangement controller are implemented by an NFV-orchestrator (NFVO) configured to implement a network service.

13. The network functions virtualization management and orchestration apparatus according to claim 1, wherein the visiting information manager periodically requests a mobility management entity (MME) connected to the plurality of base stations, to transmit information of the base station to which the terminal is connected, and generates the visiting information of the terminal, based on a response acquired from the MME.

14. The network functions virtualization management and orchestration apparatus according to claim 2, wherein the visiting information manager periodically requests a mobility management entity (MME) connected to the plurality of base stations, to transmit information of the base station to which the terminal is connected, and generates the visiting information of the terminal, based on a response acquired from the MME.

15. The network functions virtualization management and orchestration apparatus according to claim 3, wherein the visiting information manager periodically requests a mobility management entity (MME) connected to the plurality of base stations, to transmit information of the base station to which the terminal is connected, and generates the visiting information of the terminal, based on a response acquired from the MME.

16. The network functions virtualization management and orchestration apparatus according to claim 4, wherein the visiting information manager periodically requests a mobility management entity (MME) connected to the plurality of base stations, to transmit information of the base station to which the terminal is connected, and generates the visiting information of the terminal, based on a response acquired from the MME.

17. The network functions virtualization management and orchestration apparatus according to claim 1, wherein
a mobility management entity (MME) connected to the plurality of base stations transmits, when the base station to which the terminal is connected is changed, information of the base station to which the terminal is connected, to the visiting information manager, and
the visiting information manager generates the visiting information of the terminal, based on the information acquired from the MME.

18. The network functions virtualization management and orchestration apparatus according to claim 2, wherein
a mobility management entity (MME) connected to the plurality of base stations transmits, when the base station to which the terminal is connected is changed, information of the base station to which the terminal is connected, to the visiting information manager and
the visiting information manager generates the visiting information of the terminal, based on the information acquired from the MME.

\* \* \* \* \*